US009524512B2

(12) United States Patent
Shimura et al.

(10) Patent No.: US 9,524,512 B2
(45) Date of Patent: Dec. 20, 2016

(54) ADVERTISEMENT DELIVERY MANAGEMENT APPARATUS AND ADVERTISEMENT DELIVERY MANAGEMENT METHOD

(71) Applicant: YAHOO JAPAN CORPORATION, Tokyo (JP)

(72) Inventors: Kazuhiko Shimura, Tokyo (JP); Akira Tajima, Tokyo (JP); Koji Tsukamoto, Tokyo (JP); Hiroyuki Kato, Tokyo (JP); Takenobu Dei, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days.

(21) Appl. No.: 14/103,406

(22) Filed: Dec. 11, 2013

(65) Prior Publication Data

US 2014/0180812 A1 Jun. 26, 2014

(30) Foreign Application Priority Data

Dec. 25, 2012 (JP) ................................ 2012-281792

(51) Int. Cl.
*G06Q 30/02* (2012.01)
(52) U.S. Cl.
CPC ...... *G06Q 30/0255* (2013.01); *G06Q 30/0269* (2013.01)
(58) Field of Classification Search
CPC .................................................. G06Q 30/0269
(Continued)

(56) References Cited

U.S. PATENT DOCUMENTS

2008/0300964 A1   12/2008   Raghunandan
2009/0132346 A1*  5/2009   Duggal ................. G06Q 30/02
                                                                    705/7.33
(Continued)

FOREIGN PATENT DOCUMENTS

JP   A-09-091358      4/1997
JP   A-2001-265810    9/2001
(Continued)

OTHER PUBLICATIONS

Japanese Office Action issued in Japanese Application No. 2012-270605 mailed Jun. 3, 2014 (with translation).
(Continued)

*Primary Examiner* — David Stoltenberg
*Assistant Examiner* — Allan Woodworth, II
(74) *Attorney, Agent, or Firm* — Oliff PLC

(57) ABSTRACT

An advertisement delivery management apparatus according to an embodiment of the present disclosure includes a prediction information storage unit, an acquisition unit and an allocation unit. The prediction information storage unit stores information including user attributes of a plurality of delivery target users predicted as future advertisement delivery destinations. The acquisition unit acquires a plurality of order requests designating user attributes and the numbers of deliveries. The allocation unit allocates the delivery target users to the plurality of order requests, on the basis of the user attributes and the numbers of deliveries designated by the plurality of order requests, such that the number of predetermined user attributes of the delivery target users who have not been allocated to the order requests is the maximum.

9 Claims, 7 Drawing Sheets

(58) Field of Classification Search
USPC .................................................... 705/14.66
See application file for complete search history.

(56) References Cited

U.S. PATENT DOCUMENTS

| | | | | |
|---|---|---|---|---|
| 2010/0082402 | A1* | 4/2010 | Kantak et al. ................. | 705/10 |
| 2010/0161419 | A1* | 6/2010 | Tomlin ....................... | 705/14.55 |
| 2010/0185484 | A1* | 7/2010 | Sordo ................ | G06Q 10/087 |
| | | | | 705/14.6 |
| 2011/0161162 | A1 | 6/2011 | Ketchum | |
| 2011/0251875 | A1* | 10/2011 | Cosman .............. | G06Q 10/087 |
| | | | | 705/7.31 |
| 2011/0258045 | A1* | 10/2011 | Chickering et al. ....... | 705/14.53 |
| 2012/0041817 | A1 | 2/2012 | Priyadarshan et al. | |

FOREIGN PATENT DOCUMENTS

| | | |
|---|---|---|
| JP | A-2001-297251 | 10/2001 |
| JP | 2001-325505 A | 11/2001 |
| JP | A-2001-306439 | 11/2001 |
| JP | A-2002-041670 | 2/2002 |
| JP | A-2003-6518 | 1/2003 |
| JP | A-2003-67290 | 3/2003 |
| JP | A-2005-196777 | 7/2005 |
| JP | A-2007-200168 | 8/2007 |
| JP | A-2009-163425 | 7/2009 |
| JP | A-2011-238020 | 11/2011 |
| JP | 2012-043193 A | 3/2012 |
| JP | A-2012-108663 | 6/2012 |
| WO | WO 02/061619 A1 | 8/2002 |

OTHER PUBLICATIONS

Japanese Office Action issued in Japanese Application No. 2012-282033 mailed May 20, 2014 (with translation).
Jun. 3, 2014 Office Action issued in Japanese Patent Application No. 2012-270219 (with English Translation).
Jun. 17, 2014 Office Action issued in Japanese Patent Application No. 2012-258777 (with English Translation).
Jun. 17, 2014 Office Action issued in Japanese Patent Application No. 2012-258788 (with English Translation).
Jun. 16, 2015 Office Action issued in Japanese Patent Application No. 2014-126340.
May 2, 2016 Office Action issued in U.S. Appl. No. 14/097,563.
Jun. 10, 2016 Office Action issued in U.S. Appl. No. 14/107,428.
Mar. 18, 2016 Office Action issued in U.S Appl. No. 14/094,198.
Mar. 23, 2016 Office Action issued in U.S Appl. No. 14/086,489.
Mar. 24, 2016 Office Action issued in U.S Appl. No. 14/086,604.
Mar. 29, 2016 Office Action issued in Japanese Patent Application No. 2014-126340.

* cited by examiner

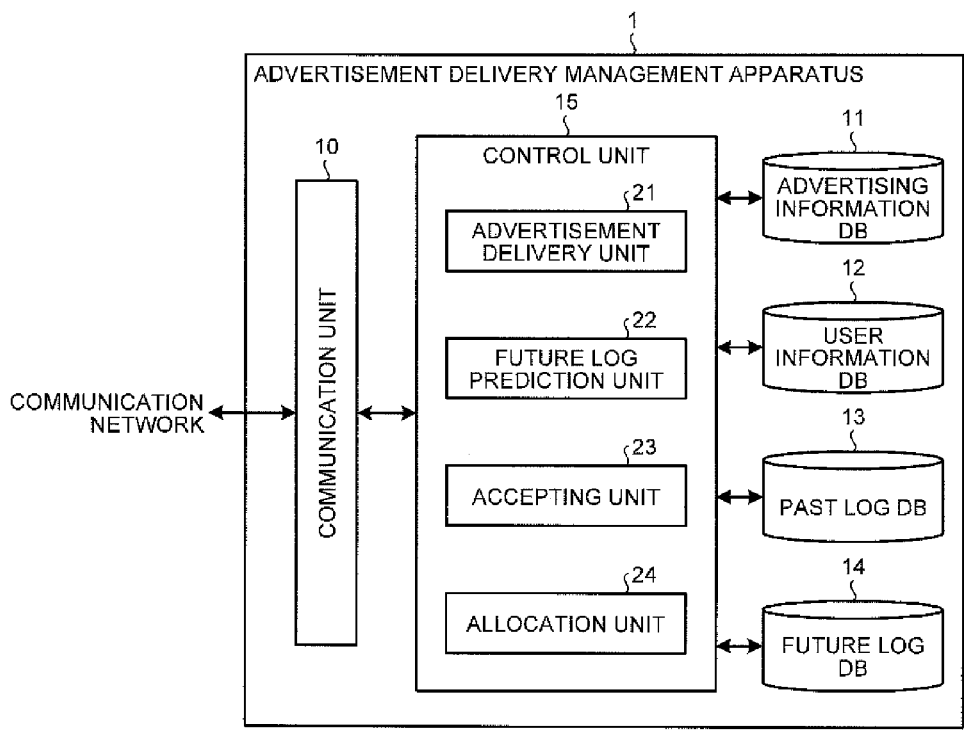

FIG.4

| USER ID | PSYCHOGRAPHIC ATTRIBUTES | | | | | DEMOGRAPHIC ATTRIBUTES | | |
|---|---|---|---|---|---|---|---|---|
| | VE-HICLE | COSME-TICS | CLO-THES | TRAVEL | ... | SEX | AGE | ... |
| U1 | 1 | 0 | 0 | 1 | ... | 2 | 21 | ... |
| U2 | 0 | 0 | 1 | 0 | ... | 1 | 44 | ... |
| ⋮ | ⋮ | ⋮ | ⋮ | ⋮ | ⋮ | ⋮ | ⋮ | ⋮ |

FIG.5

| DATE AND TIME | USER ID |
|---|---|
| 12/1/2013 6:11:05 | U1 |
| 12/1/2013 6:11:06 | U102 |
| 12/1/2013 6:12:08 | U82 |
| 12/1/2013 6:12:44 | U1 |
| 12/1/2013 6:13:02 | U102 |
| 12/1/2013 6:13:21 | U82 |
| ⋮ | ⋮ |

FIG.6

| DELIVERY TARGET ID | ALLOCATION STATE | PSYCHOGRAPHIC ATTRIBUTES | | | | | DEMOGRAPHIC ATTRIBUTES | | |
|---|---|---|---|---|---|---|---|---|---|
| | | VEHICLE | COSMETICS | CLOTHES | TRAVEL | ... | SEX | AGE | ... |
| F1 | 0 | 0 | 1 | 0 | 0 | ... | 1 | 54 | ... |
| F2 | 1 | 0 | 0 | 1 | 0 | ... | 2 | 22 | ... |
| F3 | 0 | 1 | 0 | 0 | 1 | ... | 2 | 32 | ... |
| F4 | 0 | 0 | 0 | 0 | 1 | ... | 1 | 21 | ... |
| F5 | 1 | 0 | 0 | 1 | 0 | ... | 2 | 43 | ... |
| F6 | 0 | 0 | 1 | 1 | 0 | ... | 1 | 18 | ... |
| F7 | 1 | 0 | 1 | 1 | 0 | ... | 1 | 38 | ... |
| F8 | 1 | 1 | 0 | 0 | 0 | ... | 1 | 27 | ... |
| F9 | 1 | 0 | 1 | 0 | 0 | ... | 2 | 61 | ... |
| F10 | 1 | 1 | 0 | 1 | 0 | ... | 1 | 52 | ... |
| ⋮ | ⋮ | ⋮ | ⋮ | ⋮ | ⋮ | ⋮ | ⋮ | ⋮ | ⋮ |

FIG.7

| DELIVERY TARGET ID | NUMBER OF USER ATTRIBUTES |
|---|---|
| F1 | 3 |
| F3 | 4 |
| F4 | 3 |
| F6 | 4 |
| TOTAL NUMBER OF USER ATTRIBUTES | 14 |

FIG.8

| | USER ATTRIBUTE PATTERN | | | | DELIVERY TARGET USER | |
|---|---|---|---|---|---|---|
| Pj | ATTRIBUTES | | | | NUMBER OF USERS ($c\_j$) | TARGET USER ID |
| | VEHICLE | COSMETICS | CLOTHES | TRAVEL | | |
| P1 | 1 | 0 | 0 | 0 | 9020 | F8, ⋯ |
| P2 | 0 | 1 | 0 | 0 | 5302 | F1, F9, ⋯ |
| P3 | 0 | 0 | 1 | 0 | 2319 | F2, F5, ⋯ |
| P4 | 0 | 0 | 0 | 1 | 4287 | F4, ⋯ |
| P5 | 1 | 0 | 0 | 1 | 4030 | F3, ⋯ |
| P6 | 0 | 1 | 1 | 0 | 2900 | F6, F7, ⋯ |

FIG.9

| Oi | USER ATTRIBUTE PATTERN | | | | | | DESIGNATED NUMBER OF DELIVERIES ($o\_i$) |
|---|---|---|---|---|---|---|---|
| | P1 | P2 | P3 | P4 | P5 | P6 | |
| O1 | 92 ($a\_1\_1$) | 0 ($a\_1\_2$) | 0 ($a\_1\_3$) | 0 ($a\_1\_4$) | 8 ($a\_1\_5$) | 0 ($a\_1\_6$) | 100 ($o\_1$) |
| O2 | 0 ($a\_2\_1$) | 0 ($a\_2\_2$) | 0 ($a\_2\_3$) | 0 ($a\_2\_4$) | 200 ($a\_2\_5$) | 0 ($a\_2\_6$) | 200 ($o\_2$) |
| ⋮ | ⋮ | ⋮ | ⋮ | ⋮ | ⋮ | ⋮ | ⋮ |
| TOTAL | 927 ($\Sigma a\_i\_1$) <9020 | 354 ($\Sigma a\_i\_2$) <5302 | 218 ($\Sigma a\_i\_3$) <2319 | 791 ($\Sigma a\_i\_4$) <4287 | 285 ($\Sigma a\_i\_5$) <4030 | 625 ($\Sigma a\_i\_6$) <2900 | 3200 ($\Sigma o\_i$) |

ADVERTISEMENT DELIVERY MANAGEMENT APPARATUS AND ADVERTISEMENT DELIVERY MANAGEMENT METHOD

CROSS-REFERENCE TO RELATED APPLICATIONS

The present application claims priority to and incorporates by reference the entire contents of Japanese Patent Application No. 2012-281792 filed in Japan on Dec. 25, 2012.

BACKGROUND OF THE INVENTION

1. Field of the Invention

The present invention relates to an advertisement delivery management apparatus and an advertisement delivery management method.

2. Description of the Related Art

In recent years, with the rapid spread of a network, such as the Internet, advertisements have been actively delivered through the network. As an aspect of the delivery of the advertisements, display advertising has been known which displays image or video advertisements in a predetermined space of a page (hereinafter, referred to as an advertisement delivery target page) which is to be an advertisement delivery target.

In the display advertising, advertisements are delivered to the users who have the user attributes (for example, sex, age, and interest) designated by an advertiser. Therefore, advertisements are effectively delivered (for example, see Japanese Laid-open Patent Publication No. 2011-238020).

In the delivery of the advertisements, when the user who has accessed the advertisement delivery target page has the user attributes designated by the advertiser, advertisements are delivered. Therefore, it is preferable to predict a delivery target user, who will be a future advertisement delivery destination, as a future log including the user attributes and to accept an order from the advertiser on the basis of the future log.

However, when the delivery target user as predicted as the future advertisement delivery destination has a plurality of user attributes, in some cases, it is difficult to accept a new order from the advertiser, depending a method of allocating the delivery target users to an advertisement delivery order.

SUMMARY OF THE INVENTION

According to an exemplary embodiment, an advertisement delivery management apparatus includes a predicted information storage unit, an acquisition unit, and an allocating unit. The prediction information storage unit stores information including user attributes of a plurality of delivery target users predicted as future advertisement delivery destinations. The acquisition unit acquires a plurality of order requests designating user attributes and the numbers of deliveries. The allocation unit allocates the delivery target users to the plurality of order requests on the basis of the user attributes and the numbers of deliveries designated by the plurality of order requests such that the number of predetermined user attributes of the delivery target users who have not been allocated to the order requests is the maximum.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram illustrating a structure of an advertisement delivery management apparatus according to the embodiment;

FIG. 3 is a diagram illustrating an example of an advertising information table;

FIG. 4 is a diagram illustrating an example of a user information table;

FIG. 5 is a diagram illustrating an example of an access log table;

FIG. 6 is a diagram illustrating an example of a future log table;

FIG. 7 is a diagram illustrating a method of calculating the total number of user attributes;

FIG. 8 is a diagram illustrating an example of the relation between the content of attributes in a user attribute pattern and the number of users;

FIG. 9 is a diagram illustrating an example of the allocation of the number of delivery target users in the user attribute pattern allocated to an order request;

DETAILED DESCRIPTION OF THE PREFERRED EMBODIMENTS

Hereinafter, an advertisement delivery management apparatus and an advertisement delivery management method according to an exemplary embodiment (hereinafter, referred to as an "embodiment") of the present disclosure will be described in detail with reference to the accompanying drawings. The advertisement delivery management apparatus and advertisement delivery management method according to the present disclosure are not limited by the embodiment. In the following description, in some cases, a "database" is described as a "DB".

1. Advertisement Delivery Management Process

Figure 1A:
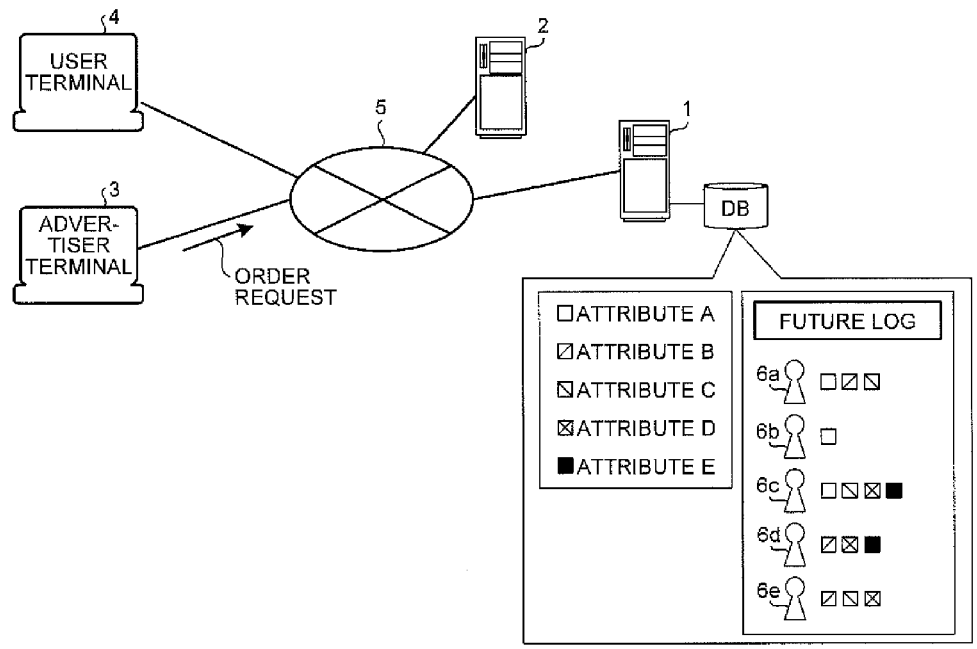
FIGS. 1A and 1B are diagrams illustrating an advertisement delivery management process according to an embodiment.
Figure 1B:
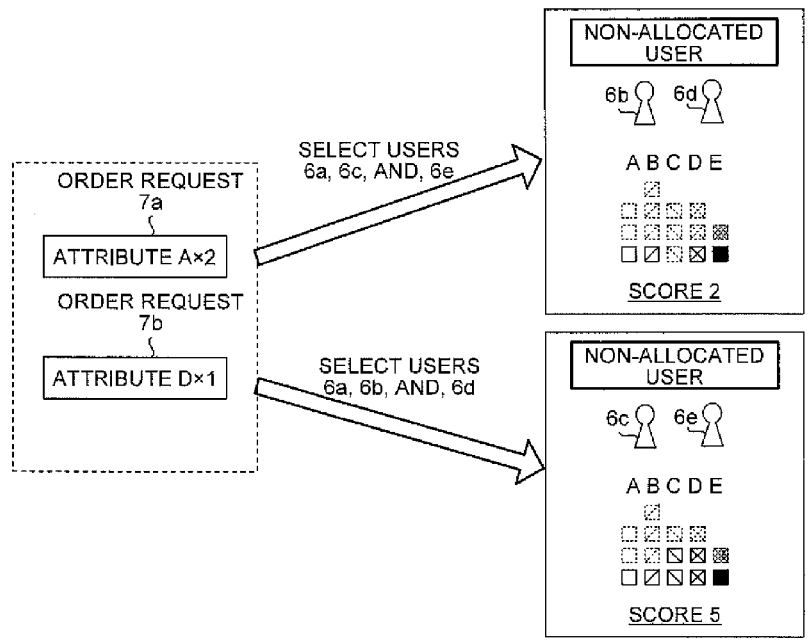

First, an advertisement delivery management process according to the embodiment will be described. FIGS. 1A and 1B are diagrams illustrating the advertisement delivery management process according to the embodiment. The advertisement delivery management process makes it possible to appropriately allocate a delivery target user in response to an order request from an advertiser.

As illustrated in FIG. 1A, an advertisement delivery management system according to the embodiment includes an advertisement delivery management apparatus 1, an information delivery apparatus 2, an advertiser terminal 3, and a user terminal 4. The advertisement delivery management apparatus 1, the information delivery apparatus 2, the advertiser terminal 3, and the user terminal 4 are connected to each other through a communication network 5. The communication network 5 is an Internet protocol (IP) network, such as the Internet. In practice, there are a plurality of advertiser terminals 3 and a plurality of user terminals 4. However, FIG. 1A illustrates one advertiser terminal 3 and one user terminal 4, for convenience of explanation.

The advertiser terminal 3 is a terminal apparatus of the advertiser who wants to deliver advertisements and sends an order request to order advertisements which is desired to be delivered to the user terminal 4 of the user with predetermined user attributes to the advertisement delivery management apparatus 1. Specifically, the advertiser terminal 3 transmits, to the advertisement delivery management apparatus 1, an order request including advertising information which the advertiser wants to insert into an advertisement delivery target page, information on the user attributes which are designated as the delivery destination of the advertising information, and information on the number of times the advertising information is delivered. Examples of the advertising information include two-dimensional content and three-dimensional content, such as banner advertisements, text advertisements, and video advertisements.

The user terminal 4 is the terminal apparatus of the user who accesses the advertisement delivery management apparatus 1 and the information delivery apparatus 2. When the information delivery apparatus 2 is accessed by the user terminal 4, for example, information delivery apparatus 2 transmits an advertisement delivery target page, such as a Web page, to the user terminal 4. The advertisement delivery target page includes a uniform resource locator (URL) of the advertising information. The user terminal 4 transmits the order request to the advertisement delivery management apparatus 1 on the basis of the URL.

The URL of the advertising information may not be the URL of the advertisement delivery management apparatus 1, but may be the URL of the information delivery apparatus 2. In this case, the user terminal 4 requests the information delivery apparatus 2 to transmit advertising information on the basis of the URL of the advertising information. When receiving the request, the information delivery apparatus 2 requests the advertisement delivery management apparatus 1 to transmit advertising information. The advertisement delivery management apparatus 1 transmits advertising information corresponding to the transmission request from the information delivery apparatus 2 to the information delivery apparatus 2. When receiving the advertising information from the advertisement delivery management apparatus 1, the information delivery apparatus 2 transmits the advertising information to the user terminal 4.

The advertisement delivery management apparatus 1 performs a process of accepting an advertisement delivery order request, a process of allocating user attributes to the accepted order request, and a process of delivering the advertising information designated by the order request to perform processes from the reception of the advertisement delivery order to the delivery of the advertising information.

The advertisement delivery management apparatus 1 stores information including the user attributes of a plurality of delivery target users, who are predicted as future advertisement delivery destinations, as a future log in a DB and performs the process of accepting the order request and the process of allocating the user attributes on the basis of the future log.

In the example illustrated in FIG. 1A, information including the user attributes of delivery target users 6a to 6e is stored as the future log in the DB. The delivery target user 6a has user attributes A, B, and C, the delivery target user 6b has the user attribute A, the delivery target user 6c has user attributes A and C to E, the delivery target user 6d has user attributes B, D, and E, and the delivery target user 6e has user attributes B to D.

The advertisement delivery management apparatus 1 acquires the order request transmitted from the advertiser terminal 3 and allocates the delivery target users to response to the order request. As described above, the order request transmitted from the advertiser terminal 3 includes information on a user attribute (hereinafter, referred to as a designated user attribute) which is designated as the delivery destination of advertising information and information on the number (hereinafter, referred to as the designated number of deliveries) of times advertising information is delivered.

The advertisement delivery management apparatus 1 performs the process of allocating the delivery target users, using a plurality of order requests as a unit. Specifically, the advertisement delivery management apparatus 1 allocates the delivery target users to a plurality of order requests such that the number of predetermined user attributes of the delivery target users who have not been allocated to the order requests is the maximum, on the basis of the designated user attributes and the designated number of deliveries in each of the plurality of order requests. Hereinafter, in some cases, the delivery target user who has not been allocated to the order request is referred to as a non-allocated user.

For example, as illustrated in FIG. 1B, a case is considered in which the advertiser terminal 3 transmits, to the advertisement delivery management apparatus 1, an order request 7a in which the designated user attributes is the "attribute A" and the designated number of deliveries is "2" and an order request 7b in which the designated user attribute is the "attribute D" and the designated number of deliveries is "1". In addition, it is assumed that the predetermined user attributes (hereinafter, referred to as adequacy determining attributes) are the "attribute B", the "attribute C", and the "attribute D".

When the delivery target users 6a and 6c with the "attribute A", which is the designated user attribute in the order request 7a, is allocated to the order request 7a and the delivery target user 6e with the "attribute D", which is the designated user attribute in the order request 7b, is allocated to the order request 7b, the numbers of attributes A to E of the non-allocated users are "1", "1", "0", "1", and "1", respectively. Therefore, the total number (hereinafter, referred to as a non-allocation score) of adequacy determining attributes (attributes B to D) of the non-allocated users is "2".

When the delivery target users 6a and 6b with the "attribute A", which is the designated user attribute in the order request 7a, is allocated to the order request 7a and the delivery target user 6d with the "attribute D", which is the designated user attribute in the order request 7b, is allocated to the order request 7b, the numbers of attributes A to E of the non-allocated users are "1", "1", "2", "2", and "1", respectively. Therefore, the non-allocation score, which is the total number of adequacy determining attributes (attributes B to D) of the non-allocated users, is "5".

When the delivery target users 6a, 6b, and 6d are allocated to the plurality of order requests 7a and 7b, the non-allocation score is the maximum. Therefore, the advertisement delivery management apparatus 1 allocates the delivery target users 6a, 6b, and 6d to the plurality of order requests 7a and 7b.

As such, the advertisement delivery management apparatus 1 allocates the delivery target users to a plurality of order requests such that the non-allocation score is the maximum. Since the non-allocation score is the number of adequacy determining attributes of the non-allocated users, for example, the user attributes which are frequently designated by the order requests are set as the adequacy determining attributes. In this case, it is possible to increase the possibility of a future order request being accepted and prevent loss of sales opportunities.

In this embodiment, the adequacy determining attributes are some user attributes among a plurality of user attributes. However, all of the user attributes may be used as the adequacy determining attributes. For example, when the delivery target users 6a, 6c, and 6e are allocated to the order requests 7a and 7b, the non-allocation score is "4". When the delivery target users 6a, 6b, and 6d are allocated to the order requests 7a and 7b, the non-allocation score is "7".

As such, when all of the user attributes are used as the adequacy determining attributes, it is possible to increase the total number of user attributes of the delivery target users which can be allocated to the order requests. Therefore, in this case, it is possible to increase the possibility of the future order request being accepted and prevent loss of sales opportunities.

Next, the detailed structure of the advertisement delivery management apparatus 1 which performs the above-mentioned advertisement delivery management process and the detailed content of the process will be described with reference to the drawings.

2. Structure of Advertisement Delivery Management Apparatus 1

FIG. 2 is a diagram illustrating the structure of the advertisement delivery management apparatus 1 according to the embodiment. As illustrated in FIG. 2, the advertisement delivery management apparatus 1 includes a communication unit 10, an advertising information DB 11, a user information DB 12, a past log DB 13, a future log DB 14, and a control unit 15. The control unit 15 includes an advertisement delivery unit 21, a future log prediction unit 22, an accepting unit 23, and an allocation unit 24.

The communication unit 10 is an interface, such as a network interface card (NIC). The control unit 15 transmits and receives various kinds of information to and from the advertiser terminal 3 or the user terminal 4 through the communication unit 10 and the communication network 5. The advertising information DB 11, the user information DB 12, the past log DB 13, and the future log DB 14 are each a semiconductor memory device, such as a hard disk, random access memory (RAM), or flash memory, or a storage device, such as an optical disk.

The control unit 15 is implemented by an integrated circuit, such as an application specific integrated circuit (ASIC) or a field programmable gate array (FPGA). A central processing unit (CPU) or a micro processing unit (MPU) executes a program stored in the internal storage device using the RAM as a work area to cause the control unit 15 to function as the advertisement delivery unit 21, the future log prediction unit 22, the accepting unit 23, and the allocation unit 24. The structure of the control unit 15 is not limited thereto, but the control unit 15 may have any structure as long as it can perform the following information processing.

Advertisement Delivery Unit 21

When a request to deliver advertising information is received from the user terminal 4, the advertisement delivery unit 21 acquires advertising information corresponding to the user attributes of the user of the user terminal 4 from an advertising information table in the advertising information DB 11 and transmits the acquired advertising information from the communication unit 10 to the user terminal 4 which is a delivery request source.

FIG. 3 is a diagram illustrating an example of the advertising information table stored in the advertising information DB 11. As illustrated in FIG. 3, the advertising information table includes information in which "user attributes", a "delivery period", "the number of deliveries", and "advertising information" are associated with each other for each "advertisement ID".

The "advertisement ID" is identification information which is allocated to each received order request. The "user attributes" are user attributes (designated user attributes) designated by the order request. The "delivery period" is the period for which the advertising information designated by the order request is delivered. The "number of deliveries" is the number (the designated number of deliveries) of times the advertising information designated by the order request is delivered. In addition, the "advertising information" is advertising information designated by the order request.

For example, for an advertisement ID "O1", the user attribute of a delivery target is "vehicle", the delivery period of advertising information is from "Jan. 1, 2013 to Jan. 31, 2013", the number of times the advertising information is delivered is "100", and the advertising information is a "banner advertisement Ya". When the number of times the advertising information is delivered is greater than "100" within the delivery period of the advertising information, the process of delivering advertising information in response to the order request ends.

When the user of the user terminal 4 who has issued the advertising information delivery request has the user attribute "vehicle", for example, the advertisement delivery unit 21 acquires the advertising information "banner advertisement Ya" with the advertisement ID "O1" from the advertising information table in the advertising information DB 11 and transmits the acquired advertising information to the user terminal 4 which is a delivery request source.

The user attributes of the user of the user terminal 4 are determined on the basis of the user information table in the user information DB 12. FIG. 4 is a diagram illustrating an example of the user information table stored in the user information DB 12. As illustrated in FIG. 4, the user information table includes information, such as a "user ID", "psychographic attributes", and "demographic attributes".

The "user ID" is identification information for identifying the user of the user terminal 4. The "user ID" corresponds to, for example, user identification information which is set to a hypertext transfer protocol (HTTP) cookie transmitted and received between the advertisement delivery management apparatus 1 and the user terminal 4.

The "psychographic attributes" are information indicating, for example, the values, lifestyle, character, and preference of the user. The "psychographic attributes" are classified into, for example, attributes "vehicle", "cosmetics", "clothes", and "travel". In the example illustrated in FIG. 4, "1" is stored in each attribute when the preference of the user is relatively high and "0" is stored in each attribute in the other cases. In addition, the "psychographic attributes" are not limited to the attributes illustrated in FIG. 4, but may include various attributes, such as economy, politics, baseball, soccer, other sports, sweets, a personal computer, white goods, and furniture.

The "demographic attributes" indicate demographic user attribute information. The "demographic attributes" are classified into, for example, attributes "sex" and "age" of the user. For example, "1" is stored in the attribute "sex"

illustrated in FIG. 4 when the user is a female and "2" is stored in the attribute "sex" when the user is a male. The age of the user is stored in the attribute "age". The "demographic attributes" are not limited to the attributes illustrated in FIG. 4, but may include various attributes, such as the job, family structure, annual income, address, native place, and academic background of the user.

For example, when the user with a user ID "U1" illustrated in FIG. 4 has issued an advertising information delivery request from the user terminal 4, it is determined that the user attributes of the user are, for example, "vehicle", "travel", "male", and "21 years old". In addition, for example, when the user with a user ID "U2" illustrated in FIG. 4 has issued an advertising information delivery request from the user terminal 4, the advertisement delivery unit 21 determines that the user attributes of the user are "clothes", "female", and "44 years old".

The advertisement delivery unit 21 sets the user ID of the user who has issued the advertising information delivery request in an access log table stored in the past log DB 13. FIG. 5 is a diagram illustrating an example of the access log table stored in the past log DB 13.

As illustrated in FIG. 5, information (hereinafter, referred to as a past log in some cases) in which the day and time when the user of the user terminal 4 issues the advertising information delivery request to the advertisement delivery management apparatus 1 is associated with the user ID is set in the access log table. The advertisement delivery unit 21 updates the access log table whenever the advertising information delivery request is issued from the user terminal 4.

Future Log Prediction Unit 22

The future log prediction unit 22 determines a plurality of delivery target users who are predicted as the future advertisement delivery destinations on the basis of the access log table stored in the past log DB 13 and sets the user information of the determined delivery target users in a future log table stored in the future log DB 14.

FIG. 6 is a diagram illustrating an example of the future log table stored in the future log DB 14. As illustrated in FIG. 6, information (hereinafter, referred to as a future log in some cases) on the delivery target user who is predicted as the advertisement delivery destination for a predetermined period in the future is set in the future log table. The future log table illustrated in FIG. 6 includes future log information, such as a "delivery target ID", an "allocation state", "psychographic attributes", and "demographic attributes".

The "delivery target ID" is identification information allocated to each delivery target user. The delivery target user is a virtual user who is different from the user set in the user information table stored in the user information DB 12.

The "allocation state" is information indicating whether the delivery target user has been allocated to the order request. When the delivery target user has been allocated to the order request, "1" is stored in the allocation state. When the delivery target user has not been allocated to the order request, "0" is stored in the allocation state.

The "psychographic attributes" and the "demographic attributes" are the same as those in the user information table in the user information DB 12. The user who is set in the user information table may be presumed as the delivery target user and the delivery target ID may be used as the user ID. In this case, information on the "psychographic attributes" and the "demographic attributes" can be acquired from the user information table on the basis of the user ID.

The future log prediction unit 22 can predict the delivery target user who will be the advertisement delivery destination for a predetermined future period on the basis of, for example, the access log in the same period last year or the access log in the previous predetermined period. For example, the future log prediction unit 22 can presume the user who issued the advertising information delivery request for the previous month as the delivery target user for the next month.

The future log prediction unit 22 can perform a statistical process for the past log which is set in the access log table to determine the tendency of the delivery target user who will be the future advertisement delivery destination and predict the future log on the basis of the determination result. In this case, for example, the future log prediction unit 22 may determine the tendency of the delivery target user, considering, for example, weather or temperature change information.

The future log prediction unit 22 can set the predicted future log in the future log table. In addition, the future log prediction unit 22 may set the future log which is acquired from an external apparatus through the communication unit 10 in the future log table.

Accepting Unit 23

The accepting unit 23 determines whether to accept the order request from the advertiser terminal 3 on the basis of the future log set in the future log table. When the accepting unit 23 determines to accept the order request, it transmits a response to the reception of the order to the advertiser terminal 3.

As described above, the order request from the advertiser terminal 3 includes designated information, such as the designated user attributes and the designated number of deliveries. When an order request is issued from the advertiser terminal 3, the accepting unit 23 counts the number of non-allocated users with the user attributes designated by the order request among the delivery target users set in the future log table. When the count result is equal to or greater than the designated number of deliveries in the order request, the accepting unit 23 accepts the order request from the advertiser terminal 3.

For example, when receiving an order request indicating that the designated user attribute is "vehicle" and the designated number of deliveries is "100", the accepting unit 23 counts the number of delivery target users with the attribute "vehicle" to which "1" is set in the future log table. When the count result is equal to or greater than "100", the accepting unit 23 accepts the order request from the advertiser terminal 3. When the count result is less than "100", the accepting unit 23 does not accept the order request from the advertiser terminal 3.

The accepting unit 23 counts a combination of two or more user attributes which are designated by the order request at a frequency equal to or greater than a threshold value as one user attribute (hereinafter, referred to as a combined user attribute in some cases). For example, when a combination of the user attributes "clothes" and "travel" is frequently designated by the order request, the accepting unit 23 counts the combination of the user attributes "clothes" and "travel" as one user attribute.

Information on the order request accepted by the accepting unit 23 is set in the advertising information table stored in the advertising information DB 11. The accepting unit 23 can determine a combination of two or more user attributes which are designated by the order request at a frequency equal to or greater than the threshold value on the basis of the advertising information table.

For example, the accepting unit 23 calculates the total number of deliveries designated by the past order request as a first sum and calculates the total number of deliveries designated by the past order request as a second sum for each combination of two or more user attributes, on the basis of the advertising information table. Then, the accepting unit 23 counts, as one user attribute, a combination of the user attributes in which the ratio of the second sum to the first sum is equal to or greater than a predetermined threshold value.

When a combination of the user attributes "vehicle" and "travel" is frequently designated by the order request and the future log table is in the state illustrated in FIG. 6, the user attribute of the delivery target user with a delivery target ID "F3" is not "vehicle" or "travel", but is "vehicle & travel".

The combination of two or more user attributes which are designated by the order request at a frequency equal to or greater than the threshold value may not be determined by the accepting unit 23, but may be set in the user information DB 12 by an external apparatus.

For example, when the number of non-allocated users is equal to or less than a predetermined value or when the number of non-allocated users with the combined user attribute is equal to or less than a predetermined value, the accepting unit 23 can divide the combined user attribute into a plurality of user attributes. Therefore, it is possible to increase the total number of user attributes. As a result, the possibility that the order request designating the combined user attribute will be accepted is reduced, but it is possible to increase the possibility that other order requests will be accepted.

Allocation Unit 24

The allocation unit 24 allocates the delivery target user set in the future log table to the order request which is accepted by the accepting unit 23.

Specifically, the allocation unit 24 allocates the delivery target users to a plurality of order requests, on the basis of the designated user attribute and the designated number of deliveries in each of the plurality of order requests, such that the number of predetermined user attributes of the delivery target users who have not been allocated to the order requests is the maximum.

The "predetermined user attribute" is the above-mentioned adequacy determining attribute and can be set by, for example, the administrator (hereinafter, referred to as a delivery administrator) of the advertisement delivery management apparatus 1 through an operation unit (not illustrated) of the advertisement delivery management apparatus 1. The delivery administrator may set all or some of the user attributes as the adequacy determining attributes.

In addition, the allocation unit 24 performs any one of a first allocation mode, a second allocation mode, and a third allocation mode on the basis of the settings set by the delivery administrator through the operation unit (not illustrated) of the advertisement delivery management apparatus 1.

When the first allocation mode is set, the allocation unit 24 repeatedly performs a process (hereinafter, referred to as a whole process in some cases) of allocating the delivery target users to all of the order requests set in the advertising information table each time the accepting unit 23 accepts a new order request.

When the second allocation mode is set, the allocation unit 24 performs a process (hereinafter, referred to as a partial process in some cases) of allocating the delivery target users to a newly acquired order request while maintaining the allocation of the delivery target users to the order requests.

When the third allocation mode is set, the allocation unit 24 performs the whole process at a predetermined time (for example, at night where the number of order requests is small) while performing the partial process for a new order request.

Next, the allocation process of the allocation unit 24 will be described in detail. When there are n order requests in the advertising information table, an order request Oi ($1 \le i \le n$; i is an integer (see FIG. 3)) is defined and it is assumed that the designated number of deliveries in the order request Oi is "o_i". When m user attribute patterns are set, a user attribute pattern Pj ($1 \le j \le m$; j is an integer) is defined and it is assumed that the number of delivery target users in the user attribute pattern Pj is "p_j".

For example, when the future log table is in the state illustrated in FIG. 6, the "user attribute pattern" is a combination of the attributes "vehicle", "cosmetics", "clothes", and "travel". For example, when the attribute pattern is defined as {vehicle, cosmetics, clothes, travel, . . . }, each attribute pattern is represented by, for example, {1, 0, 0, 0, . . . }, {0, 1, 0, 0, . . . }, and {1, 1, 1, 0, . . . }. When the number of attributes is, for example, six, the number of user attribute patterns is $2^6$. The user attributes which are less likely to be designated by the order request Oi may be excluded from the user attribute pattern.

The allocation unit 24 allocates the delivery target users to a plurality of order requests O1 to On with linear programming such that a non-allocation score KPI is the maximum, using the following formulas (1) and (2) as constraint conditions. In the above-mentioned formula (2), "a_i_j" is the number of delivery target users with a user attribute pattern Pj allocated to the order request Oi and "c_j" is the number of delivery target users with a user attribute pattern Pj.

$$\sum_{j=1}^{m} a\_i\_j = o\_i \qquad (1)$$

$$\sum_{i=1}^{n} a\_i\_j \le c\_j \qquad (2)$$

The non-allocation score KPI is based on the number of delivery target users who have not been allocated to the order requests O1 to On and is the total number of adequacy determining attributes of the delivery target users who have not been allocated to the order requests O1 to On. When the number of non-allocated users is "p", a non-allocated user Fk ($1 \le k \le p$; p is an integer) is defined. When the number of adequacy determining attributes of the non-allocated users Fk is "f_k", the non-allocation score KPI is calculated by the following formula (3):

$$KPI = \sum_{k=1}^{p} f\_k \qquad (3)$$

When all of the user attributes are set as the adequacy determining attributes, the non-allocation score KPI is the "total number of user attributes", which is the sum of the "user attributes" of the delivery target users having the "allocation state" set to "0" in the future log table.

For example, in the future log table illustrated in FIG. 6, it is assumed that the delivery target users with delivery target IDs "F1", "F3", "F4", and "F6" have not been allocated to the order requests O1 to On and the other delivery target users have been allocated to the order requests O1 to On.

In this case, as illustrated in FIG. 7, the "numbers of user attributes" of the delivery target users corresponding to the delivery target IDs "F1", "F3", "F4", and "F6" are "3", "4", "3", and "4", respectively. Therefore, as illustrated in FIG. 7, the "total number of user attributes", which is the sum of the "number of user attributes" of the non-allocated users Fk who have not been allocated to the order requests O1 to On, is "14 (=3+4+3+4)" and the non-allocation score KPI is "14".

In this embodiment, the allocation unit 24 calculates the "total number of user attributes" of the non-allocated users Fk as the non-allocation score KPI. However, the allocation unit 24 may calculate the "total number of user attribute patterns" of the non-allocated users Fk as the non-allocation score KPI.

For example, the allocation unit 24 can calculate the number "e_j" of non-allocated users Fk with the user attribute pattern Pj for each user attribute pattern Pj and use the sum of the number as the non-allocation score KPI. For example, the allocation unit 24 can calculate the non-allocation score KPI using the following formula (4):

$$KPI = \sum_{j=1}^{m} e\_j \quad (4)$$

As such, the allocation unit 24 allocates the delivery target users to a plurality of order requests O1 to On on the basis of the user attributes and the number of deliveries which are designated by each of the plurality of order requests O1 to On such that the number of predetermined user attributes of the delivery target users who have not been allocated to the order requests is the maximum.

In this way, it is possible to increase choices for the allocation of the delivery target users to the order requests O1 to On and increase the possibility of the future order requests O1 to On being accepted. Therefore, it is possible to prevent loss of sales opportunities.

In this embodiment, an example has been described in which the allocation unit 24 performs the allocation process with linear programming, using the above-mentioned formulas (1) and (2) as constraint condition, such that the non-allocation score KPI is the maximum. FIG. 8 illustrates an example of the relation between the content of attributes in the user attribute pattern Pj and the number of users c_j.

As illustrated in FIG. 8, it is assumed that user attribute patterns P1 to P6 are "vehicle", "cosmetics", "clothes", "travel", "vehicle & travel", and "cosmetics & clothes". In addition, it is assumed that the number of delivery target users is set as illustrated in FIG. 8. As illustrated in FIG. 8, it is assumed that c_1 to c_6, which are the numbers of delivery target users with the user attribute patterns, are "9020", "5302", "2319", "4287", "4030", and "2900", respectively.

When the user attribute pattern is defined as {vehicle, cosmetics, clothes, travel, . . . }, the user attribute patterns P1 to P6 are {1, 0, 0, 0}, {0, 1, 0, 0}, {0, 0, 1, 0}, {0, 0, 0, 1}, {1, 0, 0, 1}, and {0, 1, 1, 0}, respectively. Therefore, for example, the delivery target user with the user ID "F8" illustrated in FIG. 6 is set to {1, 0, 0, 0} which is the user attribute pattern P1 and the delivery target user with the user ID "F3" illustrated in FIG. 6 is set to {1, 0, 0, 1} which is the user attribute pattern P5.

The allocation unit 24 sets "a_i_j", which is the allocation of the delivery target users to the order requests, with linear programming, using the above-mentioned formulas (1) and (2) as constraint conditions, such that the non-allocation score KPI is the maximum. Assuming that the relation between the content of the attributes in the user attribute pattern Pj and the number of users c_j is in the state illustrated in FIG. 8 and the advertising information table is in the state illustrated in FIG. 3, "a_i_j" is set as illustrated in FIG. 9. FIG. 9 is a diagram illustrating an example of the allocation of "a_i_j".

In the above-mentioned formula (1), the constraint conditions are that the total number of delivery target users allocated to each order request Oi is equal to the designated number of deliveries in the order request. For example, in the order request O1 illustrated in FIG. 9, a_1_1 to a_1_6 are set such that the designated number of deliveries o_1 is "100" and the sum of a_1_1 to a_1_6 is "100".

In the above-mentioned formula (2), the constraint conditions are that, in each user attribute pattern Pj, the number of delivery target users allocated to the order request Oi is not greater than the number of users c_j which is the number of delivery target users with the user attribute pattern Pj. For example, in the user attribute pattern P1, a_1_1 to a_n_1 are set such that the number of users c_j is "9020" and the sum of a_1_1 to a_n_1 is equal to or less than "9020", as illustrated in FIG. 8.

When the first allocation mode is set, the allocation unit 24 repeatedly performs the whole process of allocating the delivery target users to all of the order requests set in the advertising information table each time the accepting unit 23 accepts a new order request. In the first allocation mode, all of the delivery target users set in the future log table are allocation targets.

For example, it is assumed that, after the delivery target users are allocated to the order requests O1 to O10, the accepting unit 23 accepts a new order request O11. In this case, the allocation unit 24 allocates a plurality of delivery target users set in the future log table to the order requests O1 to O11, using the above-mentioned formulas (1) and (2) as constraint conditions, such that the non-allocation score KPI is maximum.

In the first allocation mode, the whole process of allocating the delivery target users to all of the order requests set in the advertising information table is repeatedly performed. Therefore, it is possible to appropriately allocate the delivery target users to all of the order requests.

When the second allocation mode is set, the allocation unit 24 performs the partial process of allocating the delivery target users to a newly acquired order request, while maintaining the allocation of the delivery target users to the order requests. In the second allocation mode, the delivery target users who have not been allocated to the order requests among the delivery target users set in the future log table are allocated to a new order request.

For example, it is assumed that, after the delivery target users are allocated to the order requests O1 to O10, the accepting unit 23 accepts a new order request O11. In this case, the allocation unit 24 performs the partial process of allocating the delivery target users to the order request O11 while maintaining the allocation of the delivery target users to the order requests O1 to O10. That is, the allocation unit 24 allocates the delivery target users to a_11_j, without changing the allocation of the delivery target users to a_1_j to a_10_j.

As such, in the second allocation mode, whenever the accepting unit 23 accepts a new order request, the allocation unit 24 allocates the delivery target users to the new order request, while maintaining the allocation of the delivery target users to the order requests. Therefore, it is possible to reduce the load of the allocation process while appropriately allocating the delivery target users to a new order request.

When the third allocation mode is set, the allocation unit 24 performs the whole process at a predetermined time (for example, at night where the number of order requests is small) while performing the partial process for a new order request.

In the third allocation mode, whenever the accepting unit 23 accepts a new order request, the allocation unit 24 rapidly allocates the delivery target users to the new order request. Therefore, it is possible to rapidly update the future log table. As a result, the accepting unit 23 can rapidly accept the next new order request.

In the third allocation mode, similarly to the first allocation mode, the allocation unit 24 repeatedly performs the whole process of allocating the delivery target users to all of the order requests set in the advertising information table. Therefore, it is possible to appropriately allocate the delivery target users to all of the order requests.

As such, in the third allocation mode, whenever the accepting unit 23 accepts a new order request, the allocation unit 24 allocates the delivery target users using the partial process. In addition, the allocation unit 24 reallocates the delivery target users at a predetermined time using the whole process. Therefore, it is possible to rapidly and accurately allocate the delivery target users to the order requests.

The delivery administrator can use the operation unit (not illustrated) of the advertisement delivery management apparatus 1 to set the time when the whole process is performed in the third allocation mode to the allocation unit 24. For example, the delivery administrator can set the allocation unit 24 such that the whole process is performed at a predetermined time (for example, 2 a.m.). The delivery administrator can set the allocation unit 24 such that the whole process is performed whenever the number of new order requests reaches a predetermined value or the sum of the number of users in a new order request reaches a predetermined value.

In the above-described embodiment, the linear programming is used to allocate the delivery target users to a plurality of order requests such that the number of adequacy determining attributes of the delivery target users who have not been allocated to the order requests is the maximum. However, methods other than the linear programming may be used. That is, the allocation method is not limited to the linear programming, but any method may be used as long as it can allocate the delivery target users to a plurality of order requests on the basis of the designated user attributes and the designated number of deliveries in each order request such that the number of adequacy determining attributes of the delivery target users who have not been allocated to the order requests is the maximum.

3. Process Flow of Advertisement Delivery Management Apparatus 1

Figure 10:
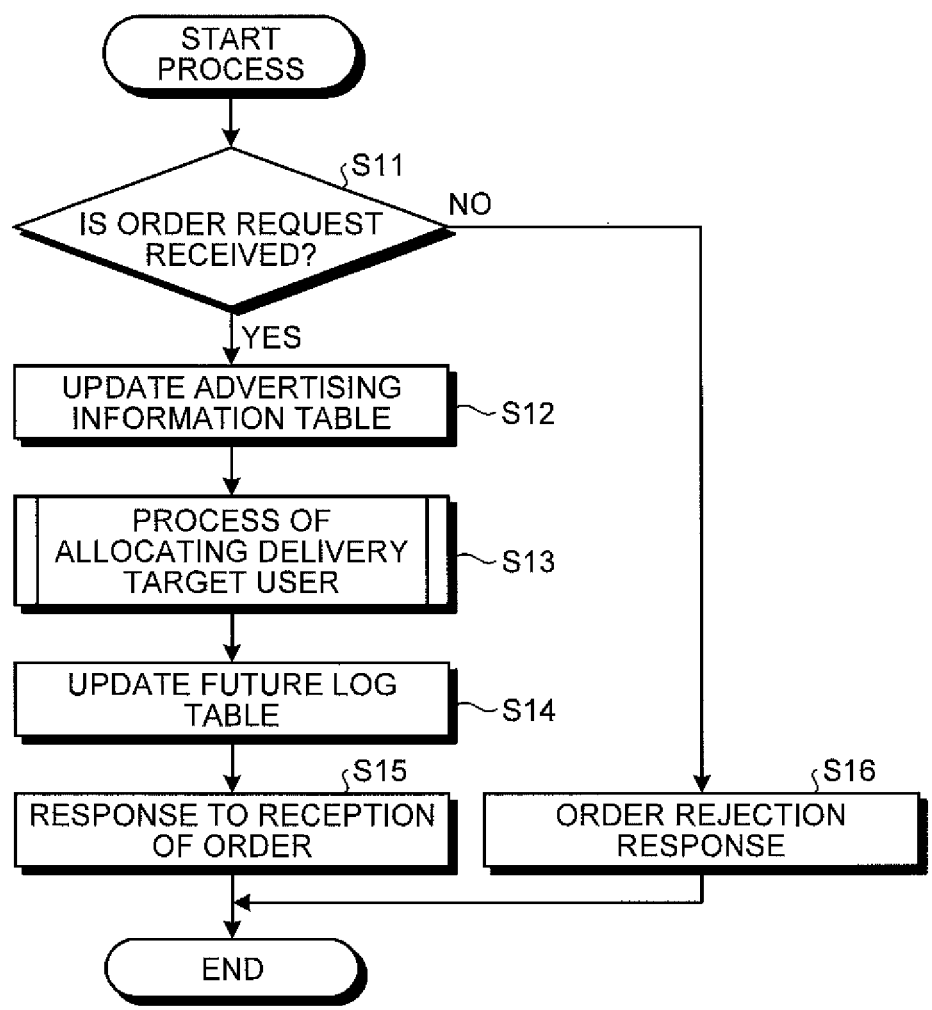
FIG. 10 is a diagram illustrating the flow of the advertisement delivery management process of the advertisement delivery management apparatus according to the embodiment.

Next, the procedure of an advertisement delivery management process of the advertisement delivery management apparatus 1 according to the embodiment will be described. FIG. 10 is a diagram illustrating an example of the flow of the advertisement delivery management process of the advertisement delivery management apparatus 1 according to the embodiment.

As illustrated in FIG. 10, when an order request is received from the advertiser terminal 3, the control unit 15 of the advertisement delivery management apparatus 1 determines whether to accept the order request from the advertiser terminal 3 on the basis of the future log set in the future log table (Step S11). For example, the control unit 15 counts the number of user attributes designated by the order request among the user attributes of the non-allocated users set in the future log table. When the count result is equal to or greater than the number of deliveries designated by the order request, the control unit 15 determines to accept the order request.

When the control unit 15 determines to accept the order request from the advertiser terminal 3 (Yes in Step S11), the control unit 15 sets information included in the order request in the advertising information table and updates the advertising information table (Step S12). The information included in the order request includes, for example, user attributes, a delivery period, the number of deliveries, and advertising information. The information is set in the advertising information table.

Then, the control unit 15 performs a process of allocating the delivery target users (Step S13). The allocation process allocates the delivery target users with the user attributes designated by the order request to the order request and corresponds to, for example, Steps S21 to S27 illustrated in FIG. 11, which will be described in detail below.

Then, the control unit 15 updates the future log table on the basis of the result of the allocation process in Step S13 (Step S14). Specifically, the control unit 15 sets, to "1", the "allocation state" of the delivery target user allocated to the order request among the delivery target users set in the future log table and sets, to "0", the "allocation state" of the delivery target user who has not been allocated to the order request.

Then, the control unit 15 transmits a response to the reception of the order to the advertiser terminal 3 through the communication unit 10 (Step S15) and ends the advertisement delivery management process. On the other hand, when the control unit 15 determines not to accept the order request from the advertiser terminal 3 in Step S11 (No in Step S11), the control unit 15 transmits an order rejection response to the advertiser terminal 3 through the communication unit 10 (Step S16) and ends the advertisement delivery management process.

Figure 11:
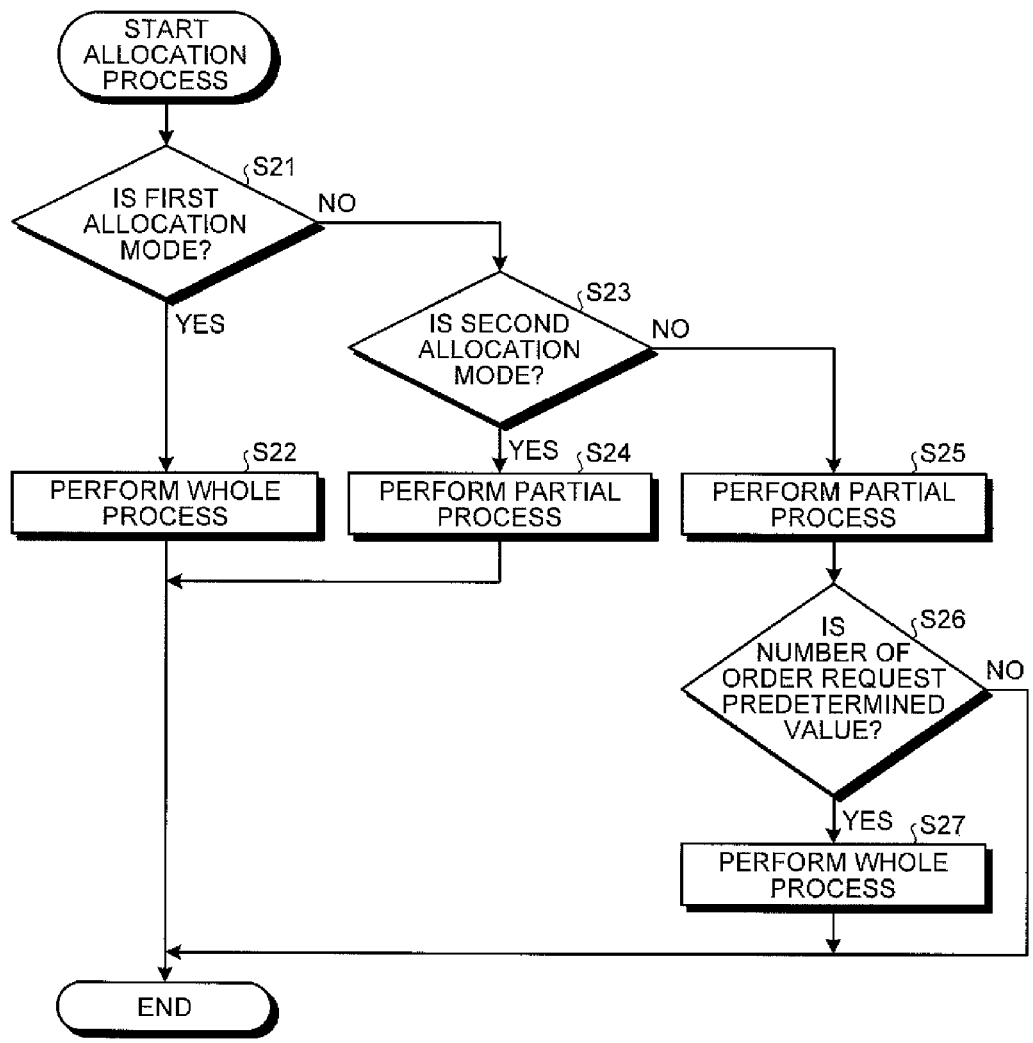
FIG. 11 is a diagram illustrating an example of the flow of an allocation process of the advertisement delivery management apparatus according to the embodiment.

Next, an example of the allocation process in Step S13 will be described in detail with reference to FIG. 11. FIG. 11 is a diagram illustrating an example of the flow of the allocation process of the advertisement delivery management apparatus 1 according to the embodiment.

As illustrated in FIG. 11, when the process of allocating the delivery target users starts, the control unit 15 of the advertisement delivery management apparatus 1 determines whether the allocation mode is set to the first allocation mode (Step S21). When it is determined that the allocation mode is set to the first allocation mode (Yes in Step S21), the control unit 15 allocates the delivery target users using the whole process (Step S22).

When it is determined in Step S21 that the allocation mode is not to the first allocation mode (No in Step S21), the control unit 15 determines whether the allocation mode is set to the second allocation mode (Step S23). When it is determined that the allocation mode is set to the second allocation mode (Yes in Step S23), the control unit 15 allocates the delivery target users to a new order request using the partial process (Step S24).

When it is determined in Step S23 that the allocation mode is not set to the second allocation mode (No in Step S23), the control unit 15 determines that the allocation mode is set to the third allocation mode and allocates the delivery target users to a new order request using the partial process (Step S25).

When the process in Step S25 ends, the control unit 15 determines whether the number of order requests accepted after the previous whole process reaches a predetermined value (Step S26). When it is determined that the number of order requests reaches the predetermined value (Yes in Step S26), the control unit 15 allocates the delivery target users using the whole process (Step S27).

When it is determined that the number of order requests does not reach the predetermined value (No in Step S26) or when the process in Steps S22, S24, and S27 ends, the control unit 15 ends the process of allocating the delivery target users.

4. Modifications

In the above-described embodiment, whenever an order request is issued from the advertiser terminal 3, the accepting unit 23 performs the accepting process. However, for example, when the user attributes designated by the order request do not overlap each other, the accepting unit 23 may perform the accepting process in a unit of plurality of order requests. In addition, for example, in the case in which the user attributes designated by the order request do not overlap each other, the accepting unit 23 may perform the accepting process when the user attributes designated by the order request overlap each other.

In the above-described embodiment, for ease of understanding, the target period for which the future advertisement delivery destination is predicted is equal to the delivery period of the order request. However, the target period for which the future advertisement delivery destination is predicted may not be equal to the delivery period of the order request. For example, the target period for which the future advertisement delivery destination is predicted may be a day and the delivery period of the order request may be a day. In this case, the allocation unit 24 can perform the process of allocating the delivery target users on a daily basis.

In the above-described embodiment, the process is performed for the order request. However, the control unit 15 may accept a cancel request from the advertiser terminal 3. In this case, the allocation unit 24 performs the whole process for a new advertisement delivery cancel request accepted by the accepting unit 23 such that the non-allocation score KPI is the maximum.

In the above-described embodiment, the first to third allocation modes are set by the delivery administrator. However, the first to third allocation modes may be changed depending on the load state of the advertisement delivery management apparatus 1. For example, when the processing load of the advertisement delivery management apparatus 1 is large, the control unit 15 performs the second allocation mode. When the processing load of the advertisement delivery management apparatus 1 is small, the control unit 15 performs the first allocation mode.

In the above-described embodiment, the control unit 15 performs the whole process in the first and third allocation modes, using all order requests as a unit of processing. However, the control unit 15 may perform the whole process, using the order requests in which the sum of the designated number of deliveries is equal to a predetermined value as a unit of processing.

In addition, the control unit 15 may allocate the delivery target users using a different allocation method until the number of non-allocated users is equal to or less than a predetermined value and perform the first to third allocation modes for the non-allocated users when the number of non-allocated users is equal to or less than the predetermined value. In the "different allocation method", the control unit 15 allocates the delivery target users to a new advertisement delivery order request such that a reduction in the total number of user attributes of the delivery target users who have not been allocated to the advertisement delivery order request among a plurality of delivery target users is the minimum. The use of the "different allocate method" makes it possible to reduce the processing load, as compared to the first to third allocation modes.

In the above-described embodiment, the control unit 15 allocates the delivery target users to a plurality of order requests such that the non-allocation score which is calculated on the basis of the non-allocated users is the maximum. However, the control unit 15 may perform the allocation process such that the non-allocation score is the maximum. For example, the control unit 15 may allocate the delivery target users to a plurality of order requests such that an allocation score which is calculated on the basis of the delivery target users allocated to the order requests is the minimum. The allocation score is the total number of delivery target users who have a predetermined user attribute and have been allocated to the order requests. For example, the non-allocation score may be calculated by subtracting the allocation score from the total number of delivery target users with a predetermined user attribute.

In the above-described embodiment, the whole process allocates the delivery target users to all of the order requests set in the advertising information table. However, the whole process may allocate the delivery target users to some of the order requests. For example, whenever the accepting unit 23 accepts a new order request, the allocation unit 24 allocates the delivery target users to a predetermined number of recently accepted order requests among the order requests which are set in the advertising information table. In this case, the allocation unit 24 allocates the delivery target users to all of the order requests set in the advertising information table at a predetermined time (for example, 2 a.m.).

5. Effect

In the advertisement delivery management apparatus 1 according to the embodiment, the future log DB 14 (an example of a prediction information storage unit) stores information including the user attributes of a plurality of delivery target users who are predicted as the future advertisement delivery destinations. The accepting unit 23 (an example of an acquisition unit) acquires a plurality of order requests designating the user attributes and the numbers of deliveries. The allocation unit 24 (an example of an allocation unit) allocates the delivery target users to a plurality of order requests on the basis of the user attributes and the numbers of deliveries designated by the plurality of order requests such that the number of adequacy determining attributes (predetermined user attributes) of the delivery target users who have not been allocated to the order requests is the maximum.

According to this structure, it is possible to appropriately allocate the delivery target users to an advertisement delivery order and prevent a reduction in the possibility of a future advertisement delivery order request being accepted. Therefore, it is possible to prevent loss of sales opportunities.

In the advertisement delivery management apparatus 1 according to the embodiment, the allocation unit 24 allocates the delivery target users to a new order request on the basis of the user attributes and the numbers of deliveries designated by a plurality of order requests including the new order request acquired by the accepting unit 23, while maintaining the allocation of the delivery target users to the order requests.

According to this structure, it is possible to reduce the load of the allocation process while appropriately allocating the delivery target users to a new order request.

In the advertisement delivery management apparatus 1 according to the embodiment, whenever the accepting unit 23 acquires a new order request, the allocation unit 24 allocates the delivery target users to a plurality of order requests including the new order request.

According to this structure, it is possible to appropriately allocate the delivery target users to all order requests and accurately prevent a reduction in the possibility of a future advertisement delivery order request being accepted.

In the advertisement delivery management apparatus 1 according to the embodiment, the allocation unit 24 reallocates the delivery target users to a plurality of order requests having the delivery target users allocated thereto at a predetermined time.

According to this structure, it is possible to rapidly and accurately allocate the delivery target users to the order requests.

In the advertisement delivery management apparatus 1 according to the embodiment, the allocation unit 24 allocates the delivery target users, using a combination of two or more user attributes which are designated by the order request at a frequency equal to or greater than a threshold value as one user attribute.

According to this structure, it is possible to allocate a combination of two or more user attributes which are designated by the order request at a frequency equal to or greater than a threshold value to the order request. Therefore, it is possible to increase the possibility of the future advertisement delivery order being accepted and prevent loss of sales opportunities.

6. Others

The advertisement delivery management apparatus 1 may be implemented by a plurality of server computers. In addition, the structure of the advertisement delivery management apparatus 1 may be flexibly changed depending on the functions. For example, an external platform may be called by an application programming interface (API) or network computing and then executed to implement the advertisement delivery management apparatus 1. The advertisement delivery management apparatus 1 and the information delivery apparatus 2 may be implemented by one server computer.

According to the embodiment, it is possible to provide an advertisement delivery management apparatus and an advertisement delivery management method which can appropriately allocate delivery target users to advertisement delivery orders.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An advertisement delivery management apparatus comprising:

a communication unit connected to an advertiser terminal, an information delivery apparatus, and a user terminal via a communication network;

a future log database configured to store: (i) user attributes of a plurality of delivery target users predicted as future advertisement delivery destinations, and (ii) allocation states of the plurality of delivery target users;

an advertisement information database configured to store: (i) user attributes, (ii) a number of deliveries, and (iii) advertising information, for each order request, the plurality of delivery target users being allocation targets; and a processor operatively coupled to the future log database and the advertising information database, the processor being programmed to perform a process including:

acquiring, from the advertiser terminal, a plurality of order requests designating user attributes and numbers of deliveries, and storing the user attributes and the numbers of deliveries in the advertising information database;

selecting a plurality of groups with respect to the plurality of order requests, each of the groups being obtained by selecting the delivery target users having the user attribute of each of the order requests by the number of deliveries of the corresponding order request, each of the groups being different from one another;

calculating a total count of predetermined user attributes of the delivery target users who have not been selected by each of the groups;

selecting one of the groups, which has a largest total count of predetermined user attributes, and allocating the delivery target users of the selected one to the plurality of order requests;

storing allocated results of the delivery target users of the selected one in the future log database to change values of each allocation state of the selected delivery target users;

when receiving a new order request designating a user attribute and a number of deliveries, selecting one of a first operation mode and a second operation mode based on a processing load of the advertisement delivery management apparatus;

when the first operation mode is selected:

performing, when acquiring the new order request designating the user attribute and the number of deliveries: (i) the selecting a plurality of groups, and (ii) the calculating a total count of predetermined user attributes with respect to the plurality of order requests and the new order request; and selecting one of the groups, which has a largest total count of predetermined user attributes of the delivery target users who have not been selected, and reallocating the delivery target users of the selected one to the plurality of order requests and the new order request; and when the second operation mode is selected:

performing, when acquiring the new order request designating the user attribute and the number of deliveries: (i) the selecting a plurality of groups, and (ii) the calculating a total count of predetermined user attributes with respect to only the new order request; and selecting one of the groups, which has a largest total count of predetermined user attributes of the delivery target users who have not been selected, and reallocating the delivery target users of the selected one to the new order request; and storing reallocated results of the delivery target users of the selected one in the future log database to change values of each allocation state of the selected delivery target users.

2. An advertisement delivery management method performed by a computer, the advertisement delivery management method comprising:

acquiring, by the computer, a plurality of order requests designating user attributes and numbers of deliveries, and storing the user attributes and the numbers of deliveries in an advertising information database;

selecting, by the computer, a plurality of groups with respect to the plurality of order requests, each of the groups being obtained by selecting the delivery target users having the user attribute of each of the order requests by the number of deliveries of the corresponding order request, each of the groups being different from one another;

calculating, by the computer, a total count of predetermined user attributes of the delivery target users who have not been selected by each of the groups;

selecting, by the computer, one of the groups, which has a largest total count of predetermined user attributes, and allocating the delivery target users of the selected one to the plurality of order requests;

storing, by the computer, allocated results of the delivery target users of the selected one in the future log database to change values of each allocation state of the selected delivery target users;

when receiving a new order request designating a user attribute and a number of deliveries, selecting, by the computer, one of a first operation mode and a second operation mode based on a processing load of the computer;

when the first operation mode is selected:

performing, by the computer, when acquiring the new order request designating the user attribute and the number of deliveries: (i) the selecting a plurality of groups, and (ii) the calculating a total count of predetermined user attributes with respect to the plurality of order requests and the new order request; and selecting, by the computer, one of the groups, which has a largest total count of predetermined user attributes of the delivery target users who have not been selected, and reallocating the delivery target users of the selected one to the plurality of order requests and the new order request; and when the second operation mode is selected:

performing, by the computer, when acquiring the new order request designating the user attribute and the number of deliveries: (i) the selecting a plurality of groups, and (ii) the calculating a total count of predetermined user attributes with respect to only the new order request; and selecting, by the computer, one of the groups, which has a largest total count of predetermined user attributes of the delivery target users who have not been selected, and reallocating the delivery target users of the selected one to the new order request; and storing, by the computer, reallocated results of the delivery target users of the selected one in the future log database to change values of each allocation state of the selected delivery target users.

3. The advertisement delivery management apparatus according to claim 1, wherein the processor is programmed to perform the process further comprising:

acquiring a plurality of order requests designating user attributes and numbers of deliveries;

calculating, when acquiring a new order request designating user attributes and a number of deliveries, a total count of predetermined user attributes with respect to the new order request while maintaining the allocation to the plurality of order requests to which the delivery target users have been allocated;

selecting a group with respect to the new order request, which has a largest total count of predetermined user attributes of the delivery target users who have not been selected, and allocating the delivery target users of the group to the new order request;

performing, at a predetermined time: (i) the selecting a plurality of groups, and (ii) calculating a total count of predetermined user attributes with respect to the plurality of order requests and the new order request; and selecting a group, which has a largest total count of predetermined user attributes of the delivery target users who have not been selected, and reallocating the delivery target users of the selected group to the plurality of order requests and the new order request.

4. The advertisement delivery management method according to claim 2, further comprising:

calculating, by the computer, when acquiring a new order request designating user attributes and a number of deliveries, a total count of predetermined user attributes with respect to the new order request while maintaining the allocation to the plurality of order requests to which the delivery target users have been allocated;

selecting, by the computer, a group with respect to the new order request, which has a largest total count of predetermined user attributes of the delivery target users who have not been selected, and allocating the delivery target users of the group to the new order request;

performing, by the computer, at a predetermined time: (i) the selecting a plurality of groups, and (ii) the calculating a total count of predetermined user attributes with respect to the plurality of order requests and the new order request; and selecting, by the computer, a group, which has a largest total count of predetermined user attributes of the delivery target users who have not been selected, and reallocating the delivery target users of the selected group to the plurality of order requests and the new order request.

5. The advertisement delivery management apparatus according to claim 1, wherein the processor is programmed to perform the process further comprising:

performing, when acquiring a cancel request of canceling one order request of the plurality of order requests: (i) the selecting a plurality of groups, and (ii) the calculating a total count of predetermined user attributes with respect to the plurality of order requests excepting the cancel request; and selecting a group, which has a largest total count of predetermined user attributes of the delivery target users who have not been selected, and reallocating the delivery target users of the selected group to the plurality of order requests excepting the cancel request.

6. The advertisement delivery management apparatus according to claim 3, wherein the processor is programmed to perform the process further comprising:

performing, when acquiring a cancel request of canceling one order request of the plurality of order requests: (i) the selecting a plurality of groups, and (ii) the calculating a total count of predetermined user attributes with respect to the plurality of order requests excepting the cancel request;

selecting a group, which has a largest total count of predetermined user attributes of the delivery target users who have not been selected, and reallocating the delivery target users of the selected group to the plurality of order requests excepting the cancel request.

7. The advertisement delivery management method according to claim 2, further comprising:

performing, by the computer, when acquiring a cancel request of canceling one order request of the plurality of order requests: (i) the selecting a plurality of groups, and (ii) the calculating a total count of predetermined user attributes with respect to the plurality of order requests excepting the cancel request;

selecting, by the computer, a group, which has a largest total count of predetermined user attributes of the delivery target users who have not been selected, and reallocating the delivery target users of the selected group to the plurality of order requests excepting the cancel request.

8. The advertisement delivery management method according to claim 4, further comprising:

performing, by the computer, when acquiring a cancel request of canceling one order request of the plurality of order requests: (i) the selecting a plurality of groups, and (ii) the calculating a total count of predetermined user attributes with respect to the plurality of order requests excepting the cancel request;

selecting, by the computer, a group, which has a largest total count of predetermined user attributes of the delivery target users who have not been selected, and reallocating the delivery target users of the selected group to the plurality of order requests excepting the cancel request.

9. The advertisement delivery management method according to claim 1, wherein the processor is programmed to perform the process further comprising:

acquiring, from the advertiser terminal, a new order request designating a user attribute and a number of deliveries;

counting a number of users having the user attribute designated by the new order request among the user attributes of non-allocated users set in the future log database;

determining whether the number of users is equal to or greater than the number of deliveries designated by the new order request; and performing, when the count result is equal to or greater than the number of deliveries designated by the new order request: (i) the selecting a plurality of groups, and (ii) the calculating a total count of predetermined user attributes with respect to the plurality of order requests and the new order request.

* * * * *